(12) United States Patent
Ovadia

(10) Patent No.: US 11,625,081 B2
(45) Date of Patent: Apr. 11, 2023

(54) CENTRALIZED PROFILE-BASED OPERATIONAL MONITORING AND CONTROL OF REMOTE COMPUTING DEVICES

(71) Applicant: Charter Communications Operating, LLC, St. Louis, MO (US)

(72) Inventor: Shlomo Ovadia, Denver, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 17 days.

(21) Appl. No.: 17/196,497

(22) Filed: Mar. 9, 2021

(65) Prior Publication Data

US 2022/0291728 A1 Sep. 15, 2022

(51) Int. Cl.
| | |
|---|---|
| G06F 1/20 | (2006.01) |
| G06N 20/00 | (2019.01) |
| G06F 1/3234 | (2019.01) |
| G06F 1/3206 | (2019.01) |
| H04W 52/02 | (2009.01) |
| G06F 9/50 | (2006.01) |
| G06F 1/3203 | (2019.01) |
| G06F 1/324 | (2019.01) |

(52) U.S. Cl.
CPC ............ *G06F 1/206* (2013.01); *G06F 1/3206* (2013.01); *G06F 1/3234* (2013.01); *G06N 20/00* (2019.01); *G06F 1/3203* (2013.01); *G06F 1/324* (2013.01); *G06F 9/5094* (2013.01); *H04W 52/0206* (2013.01)

(58) Field of Classification Search
CPC ...... G06F 1/3203; G06F 1/324; G06F 1/3206; G06F 1/206; G06F 9/5094; G06F 1/3234; G06N 20/00; H04W 52/0206

USPC .......................... 713/320, 323; 709/220, 223
See application file for complete search history.

(56) References Cited

U.S. PATENT DOCUMENTS

| | | | | |
|---|---|---|---|---|
| 8,868,764 B2 * | 10/2014 | Morrissey | ........... | H04L 61/5061 709/228 |
| 10,963,333 B1 * | 3/2021 | Nijim | .................. | G06F 11/3006 |
| 2002/0173858 A1 * | 11/2002 | Sherlock | ............ | G05B 23/0221 700/1 |

(Continued)

OTHER PUBLICATIONS

Bartlett, Mitch, "What is Thermal Throttling?," Technipages, www.technipages.com/what-is-thermal-throttling, Jul. 8, 2020, 6 pages.

*Primary Examiner* — Ji H Bae
(74) *Attorney, Agent, or Firm* — Dority & Manning, P.A.

(57) ABSTRACT

Centralized profile-based operational monitoring and control of remote computing devices. A controller device receives, from a first customer-premises device (CPD) associated with a first local area network, at a first time a first temperature value that quantifies a temperature of the first CPD, the first CPD having a plurality of different energy consumption operating modes. The controller device, based on an attribute of the first CPD, accesses a first CPD profile of a plurality of different CPD profiles to determine a preferred CPD temperature range. The controller device determines that the first temperature value is outside of the preferred CPD temperature range, and sends an instruction that instructs the first CPD to transition from a current energy consumption operating mode to a first reduced energy consumption operating mode based at least in part on the first temperature value.

21 Claims, 10 Drawing Sheets

(56) References Cited

U.S. PATENT DOCUMENTS

| | | | | |
|---|---|---|---|---|
| 2012/0034912 A1* | 2/2012 | Kamdar | ................... | H04N 7/20 |
| | | | | 455/425 |
| 2016/0349812 A1* | 12/2016 | Goh | .................... | G06F 11/3058 |
| 2020/0042070 A1* | 2/2020 | Rodriguez Bravo | ........................ | |
| | | | | G06F 1/3212 |
| 2022/0021612 A1* | 1/2022 | Zhou | .................... | H04L 1/0075 |

* cited by examiner

CENTRALIZED PROFILE-BASED OPERATIONAL MONITORING AND CONTROL OF REMOTE COMPUTING DEVICES

BACKGROUND

Computing devices owned or managed by an entity may be physically located in a variety of different facilities. One example is a service provider that may provide equipment, such as a cable modem, a passive-optical network (PON) optical network unit (ONU), a wireless router, or the like, to customers who obtain networking services from the service provider. The service provider may provide different brands of the same type of equipment to different customers, and/or different models of the same brand to different customers. The computing devices are subject to different environmental conditions in the different customer facilities. In one facility, a computing device may be located in a room with a generally high ambient temperature and high air movement, while, in another facility, a computing device may be located in a room with a generally low ambient temperature and low air movement.

SUMMARY

The embodiments disclosed herein implement centralized profile-based operational monitoring and control of remote devices.

In one embodiment a method is provided. The method includes receiving, by a controller device from a first customer-premises device (CPD) associated with a first local area network, at a first time a first temperature value that quantifies a temperature of the first CPD, the first CPD having a plurality of different energy consumption operating modes. The method further includes, based on an attribute of the first CPD, accessing a first CPD profile of a plurality of different CPD profiles to determine a preferred CPD temperature range. The method further includes determining that the first temperature value is outside of the preferred CPD temperature range. The method further includes sending an instruction that instructs the first CPD to transition from a current energy consumption operating mode to a first reduced energy consumption operating mode based at least in part on the first temperature value.

In another embodiment a computing device is provided. The computing device includes a memory and a processor device coupled to the memory. The processor device is configured to receive, from a first customer-premises device (CPD) associated with a first local area network, at a first time a first temperature value that quantifies a temperature of the first CPD, the first CPD having a plurality of different energy consumption operating modes. The processor device is further configured to, based on an attribute of the first CPD, access a first CPD profile of a plurality of different CPD profiles to determine a preferred CPD temperature range. The processor device is further configured to determine that the first temperature value is outside of the preferred CPD temperature range, and send an instruction that instructs the first CPD to transition from a current energy consumption operating mode to a first reduced energy consumption operating mode based at least in part on the first temperature value.

In another embodiment a non-transitory computer-readable storage medium is provided. The non-transitory computer-readable storage medium includes executable instructions configured to cause a processor device to receive, from a first customer-premises device (CPD) associated with a first local area network, at a first time a first temperature value that quantifies a temperature of the first CPD, the first CPD having a plurality of different energy consumption operating modes. The executable instructions are further configured to cause the processor device to, based on an attribute of the first CPD, access a first CPD profile of a plurality of different CPD profiles to determine a preferred CPD temperature range. The executable instructions are further configured to cause the processor device to determine that the first temperature value is outside of the preferred CPD temperature range, and send an instruction that instructs the first CPD to transition from a current energy consumption operating mode to a first reduced energy consumption operating mode based at least in part on the first temperature value.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
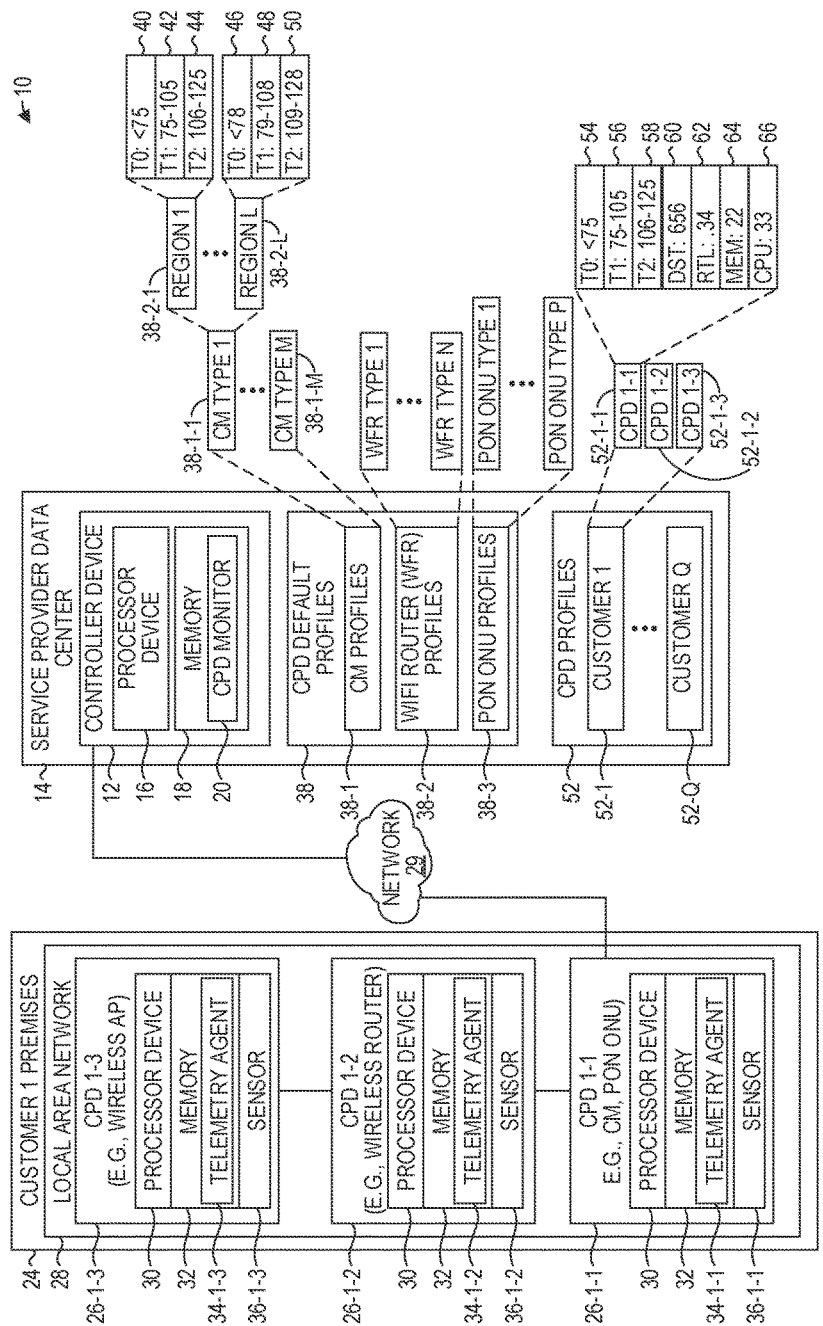
FIG. 1 is a block diagram of an environment in which embodiments may be practiced.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Computing devices owned or managed by an entity may be physically located in a variety of different facilities. One example is a service provider that may provide equipment, such as a cable modem, a passive-optical network (PON) optical network unit (ONU), a wireless router, or the like, to customers who obtain networking services from the service provider. The service provider may provide different brands of the same type of equipment to different customers, and/or different models of the same brand to different customers. The computing devices are subject to different environmental conditions in the different customer facilities. In one facility, a computing device may be located in a room with a generally high ambient temperature and high air movement, while, in another facility, a computing device may be located in a room with a generally low ambient temperature and low air movement. In addition, a computing device may be located in a room at a high altitude in one facility, and in a room below sea level at another facility.

Computing devices are relatively sensitive to heat. As a component, such as a microprocessor, rises in temperature, the component may suffer performance degradation, and the life span of the component generally diminishes. At a particular temperature, the computing device may be designed to completely shut down, and even prior to reaching such temperature, the computing device may be designed to reduce performance in an effort to reduce heat, or may simply reduce performance because the heated components cannot operate as efficiently as they can when at lower temperatures.

Users of such equipment may be dissatisfied with performance degradation, or with an abrupt shutdown of a computing device, unaware that the problem arose from a heat-related issue. The service provider may then expend substantial costs working with the customer to determine the source of the problem, and, over time, expend costs to replace equipment that had a shortened lifespan due to operating at higher temperatures.

The embodiments disclosed herein implement centralized profile-based operational monitoring and control of remote devices. A centralized controller device receives real-time operational data from a computing device coupled to a local area network, such as a temperature value, or an average temperature value, of the computing device. The controller device accesses a customer-premises device (CPD) profile to obtain a preferred CPD temperature range. If the controller device determines that the temperature value is outside of the preferred CPD temperature range, the controller device may instruct the computing device to transition to a first reduced energy consumption operating mode that has a lower power consumption than the current energy consumption operating mode of the computing device. The first reduced energy consumption operating mode may, for example, cause the computing device to go into a mode wherein the computing device performs fewer non-essential tasks, or reduces available throughput, or may comprise an idle mode where the computing device does not transmit or receive for a period of time. The controller device subsequently receives additional temperature values from the computing device, and may instruct the computing device to return to a normal or default energy consumption operating mode if the temperature value is in the preferred CPD temperature range, or, if not, may instruct the computing device to transition to a second reduced energy consumption operating mode to further reduce heat.

In some embodiments, the controller device may instruct the computing device to provide operational values that quantify an operational metric of the computing device, such as a real-time downstream (DS) or upstream (US) throughput of the computing device. The controller device may determine, over time, that the preferred CPD temperature range can be increased or decreased without a meaningful reduction in the operational or performance metrics, such as without a reduction in DS and/or US throughput. The controller device may then store a new preferred CPD temperature range in the CPD profile that corresponds to the computing device. The controller device may monitor and control hundreds or thousands of other computing devices coupled to corresponding local area networks, substantially concurrently. Each such computing device may have a corresponding CPD profile that, over time, is tailored to the particular computing device based on telemetry data received by the controller device from the computing device.

Among other advantages, the embodiments identify heat-related issues in remote computing devices prior to such issues causing the computing device to shut down, and extend the life of the computing devices by minimizing the amount of time such computing devices operate at potentially damaging temperatures.

FIG. 1 is a block diagram of an environment 10 in which embodiments may be practiced. The environment 10 includes a controller device 12 located, for example, in a service provider data center 14, or some other centralized location, such as a cloud computing environment. While for purposes of illustration the embodiments are discussed in the context of a service provider that provides broadband communications services to customers, the embodiments are not limited to such a context, and have applicability in any context in which a plurality of different computing devices can be monitored by a centralized controller device.

The controller device 12 includes a processor device 16 and a memory 18. In some embodiments, the controller device 12 may be a computing device that implements the functionality described herein via one or more software processes or components, such as, in this example, a customer-premises device (CPD) monitor 20. In other implementations, the controller device 12 may be a special-purpose computing device that implements the functionality described herein via hardware circuitry or a combination of hardware circuitry and software. It is noted that, because the CPD monitor 20 is a component of the controller device 12, functionality implemented by the CPD monitor 20 may be attributed to the controller device 12 generally. Moreover, in examples where the CPD monitor 20 comprises software instructions that program the processor device 16 to carry out functionality discussed herein, functionality implemented by the CPD monitor 20 may be attributed herein to the processor device 16.

The environment 10 includes a customer premises 24 that houses, in this example, three computing devices, referred to herein as customer-premises devices 26-1-1, 26-1-2 and 26-1-3 (generally CPDs 26). The three CPDs 26 may be located in the same environment, or in different environments. For example, the CPD 26-1-1 may be a cable modem or a passive-optical network (PON) optical network unit (ONU) that is located in a room with little ventilation, and has other electronic devices stacked on top of the CPD 26-1-1. The CPD 26-1-2 may be a wireless router that is located in the same room as the CPD 26-1-1 and communicates with the CPD 26-1-1 via an Ethernet cable, but is physically distant from other electronic devices in the room. The CPD 26-1-3 may be a wireless access point or wireless mesh network router/extender that is located in a foyer of the customer premises 24 where the temperature is generally lower than the room in which the CPDs 26-1-1 and 26-1-2 are located.

The CPDs 26 are all associated with a same local area network (LAN) 28. The CPDs 26-1-2 and 26-1-3 may each have IP addresses that have identical network addresses. The CPDs 26-1-2 and 26-1-3 use the same subnet mask to determine which computing devices exist on the LAN 28, and which do not. The controller device 12 is on a different network from the LAN 28, and thus has a network address that identifies a different network than the LAN 28. The CPD 26-1-1 may also have an internet protocol (IP) address on the LAN 28 or may be a device that couples to a router device on the LAN 28 and interfaces the router device with another device on the service provider network, such as a cable modem termination system (CMTS), or the like. For example, if the CPD 26-1-1 is a combination router and cable modem, the CPD 26-1-1 may have an IP address on the LAN 28 and operate as a level 3 (of the Open Systems Interconnection (OSI) model) IP gateway to other networks for the computing devices on the LAN 28, and may have an IP address on a wide area network (WAN) to communicate directly with a device outside of the LAN 28, such as a CMTS, to physically transport data to and from the LAN 28. In other embodiments, the gateway router of the LAN 28 may be separate from the CPD 26-1-1, and the CPD 26-1-1 interfaces, via one port, with the router, and, via a second port that has an IP address on a WAN, with a device outside of the LAN 28, such as the CMTS to physically transport data to and from the LAN 28. In this example, the CPD 26-1-1 may not have an IP address on the LAN 28.

Each of the CPDs 26 include a processor device 30 and a memory 32. The CPD 26-1-1 includes a telemetry agent 34-1-1 that is configured to provide telemetry data to the controller device 12 intermittently, periodically, upon the occurrence of an event, such as, by way of non-limiting example, a change in operational metrics, or in response to a request from the controller device 12. In some embodiments, the telemetry agent 34-1-1 may provide real-time or determined information relating to CPU utilization, system memory utilization, system load, networking information such as IP address, subnet mask, dynamic host configuration protocol (DHCP) status, instantaneous and/or average system temperature over a particular period of time, average, minimum, and/or maximum round-trip IPv4 and IPv6 latency of time between the CPD 26-1-1 and a specific device in the LAN 28 or in a different network, packet information regarding packets delivered to or received from the CPDs 26-1-2 and 26-1-3, security notifications regarding attempted tampering, and alerts regarding thermal conditions. If the CPD 26-1-1 is a cable modem, or a gateway with an embedded cable modem, the telemetry information may also include downstream and upstream channel information, such as channel ID, channel type, lock status, channel bonding status, received power level, signal-to-noise ratio/modulation error ratio (SNR/MER), channel center frequency, channel width, modulation profile, corrected Codewords, unerrored Codewords, and the like. The CPD 26-1-1 includes a sensor 36-1-1 that is configured to measure a temperature value of the CPD 26-1-1, such as a temperature of a particular component of the CPD 26-1-1, such as the processor device 30, or the temperature of an internal volume of the CPD 26-1-1, or the like. The CPDs 26-1-2 and 26-1-3 may similarly have telemetry agents 34-1-2 and 34-1-3, and sensors 36-1-2 and 26-1-3, respectively.

Each of the CPDs 26 have a plurality of different energy consumption operating modes to which the controller device 12 can instruct such CPDs 26 to transition for a predetermined period of time or until instructed otherwise, including a default energy consumption operating mode and one or more reduced energy consumption operating modes. If a computing device has multiple reduced energy consumption operating modes, the reduced energy consumption operating modes typically offer increasingly reduced functionality as the computing device transitions from one reduced energy consumption operating mode to another reduced energy consumption operating mode. The reduced energy consumption operating modes of the computing device are designed to utilize less energy, and thus to generate less heat.

The particular reduced energy consumption operating modes may differ depending on the type of computing device. As an example, for a CPD 26 that is a cable modem, a first reduced energy consumption operating mode may be a Data Over Cable Service Interface Specification (DOCSIS) Light Sleep (DLS) mode wherein the cable modem repeatedly sleeps for a predetermined period of time, such as 200 ms, and thereafter wakes up. The cable modem may be instructed to enter the DLS mode for a particular period of time, such as one minute, five minutes, or the like. A second reduced energy consumption operating mode may be an idle mode wherein the cable modem does not transmit or receive data from devices coupled to the LAN 28 for a period of time but can still communicate with the controller device 12. A third reduced energy consumption operating mode may be a voice-only mode wherein the cable modem no longer provides data services but continues to provide voice services. A fourth reduced energy consumption operating mode may be a shutdown mode, wherein the cable modem is instructed to shut down. An additional reduced energy consumption operating mode may be a mode wherein the cable modem temporarily reduces downstream and/or upstream throughput. For example, in a default energy consumption operating mode of a cable modem, an average downstream throughput may be 700 Mb per second (Mbps). To reduce energy, the cable modem may throttle down the downstream throughput to 300 Mbps.

For a CPD 26 that is a wireless router or access point, reduced energy consumption operating modes may include, by way of non-limiting example, a first reduced energy consumption operating mode wherein certain types of wireless transmissions, such as 2.4 GHz or 5 GHz transmissions are halted, a second reduced energy consumption operating mode that is an idle mode wherein the router no longer allows communications outside of the LAN 28, and a third reduced energy consumption operating mode that is a shutdown mode. In the first reduced energy consumption operating mode, the Wi-Fi radio for either 2.4 GHz or 5 GHz or both is temporarily turned off to save power consumption.

For a CPD 26 that is an ONU, reduced energy consumption operating modes may include, by way of non-limiting example, a first reduced energy consumption operating mode, such as a power shedding mode involving ONU-initiated disabling of unused Universal Network Interfaces (UNIs) or RF (Radio Frequency). A second reduced energy consumption operating mode may be a power doze mode, involving OLT initiated disabling of non-essential ONU functions and the optical transmitter (TX), that leaves the optical receiver (RX) operational. A third reduced energy consumption operating mode may be a power sleep mode wherein OLT initiated Deep or Fast Sleep can disable non-essential ONU functions and also disable both the optical RX and TX during negotiated time slots.

The controller device 12 maintains a plurality of CPD default profiles 38 that store default operational values of certain operational metrics of a CPD. In this example, the operational values relate to a temperature operational metric, and the temperature values stored in the CPD default profiles 38 can be used to determine a preferred temperature range of a CPD. The operational values in the CPD default profiles 38 may be based on a type of CPD device, such as, by way of non-limiting example, a plurality of CPD default profiles 38-1 for CPDs of type cable modem, a plurality of CPD default profiles 38-2 for CPDs of type wireless router, and a plurality of CPD default profiles 38-3 for CPDs of type PON ONU. The CPD default profiles 38-1 may include a plurality of CPD default profiles 38-1-1-38-1-M that correspond to different types of cable modems, such as cable modems from different silicon manufacturers and/or original equipment manufacturers (OEMs), and/or different models of cable modems from the same manufacturer. For each of the CPD default profiles 38-1-1-38-1-M, there may be a plurality of CPD default profiles 38-2-1-38-2-L based on region of the country in which the CPDs will be used by a customer, such as the northeast region of the United States, the southwest region of the United States, and the like.

In this example, the CPD default profile 38-2-1 is used for a cable modem provided to a customer in region 1, and identifies a default preferred temperature range 40 of less than 75 degrees Celsius (C), a first non-preferred temperature range 42 of between 75 and 105 degrees, and a second non-preferred temperature range 44 of between 106 and 125 degrees. All degrees discussed herein are with reference to degrees Celsius (C). The CPD default profile 38-2-L is used for a cable modem provided to a customer in region L, and identifies a default preferred temperature range 46 of less than 78 degrees, a first non-preferred temperature range 48 of between 79 and 108 degrees, and a second non-preferred temperature range 50 of between 109 and 128 degrees. The difference in temperature ranges may be determined over time based on telemetry data received by the controller device 12 from cable modems in such regions, and additional operational metrics received from such cable modems that indicate that cable modems in region L typically can operate at higher temperatures without a corresponding reduction in operational performance. The CPD default profiles 38-2 and 38-3 may be similarly organized based on CPD type and CPD region.

The service provider generates, for each of the CPDs 26-1-1-26-1-3, a corresponding CPD profile 52 based on a CPD default profile 38 in accordance with the type of device of the CPDs 26-1-1-26-1-3 and the particular region in which the customer premises 24 is located. In this example, the customer premises 24 is in region 1, and the CPD profile 52-1 includes a CPD profile 52-1-1 that corresponds to the CPD 26-1-1, a CPD profile 52-1-2 that corresponds to the CPD 26-1-2, and a CPD profile 52-1-3 that corresponds to the CPD 26-1-3.

Because the CPD default profile 38-2-1 was used to generate the CPD profile 52-1-1, the CPD profile 52-1-1 initially includes temperature ranges 54, 56, and 58 that are identical to the temperature ranges 40, 42, and 44 of the CPD default profile 38-2-1. The CPD profiles 52 may be generated automatically by the controller device 12 or some other component of the service provider at the time the CPD 26 is provisioned in the customer premises 24, or may be generated manually by an operator.

For purposes of illustration, example interactions between the CPD 26-1-1 and the controller device 12 suitable for implementing centralized profile-based operational monitoring and control of remote computing devices according to one embodiment will now be described. It should be noted that, while not discussed below, in practice, substantially similar interactions could be concurrently occurring between the CPDs 26-1-2 and 26-1-3 and the controller device 12, and between the controller device 12 and hundreds or thousands of other CPDs 26 in other customer premises.

The controller device 12 may determine and store certain baseline operational values for the CPD 26-1-1 that quantify certain operational metrics during times when the CPD 26-1-1 is in a preferred temperature range. By way of non-limiting example, the controller device 12 may determine an average downstream throughput value that quantifies the downstream throughput between the CPD 26-1-1 and a device reachable via a network 29, and store this information as a baseline downstream (DS) throughput value 60. As an example, the controller device 12 may send the CPD 26-1-1 an instruction to initiate a speed test between the CPD 26-1-1 and a server that offers a speed test service, and to thereafter provide the controller device 12 with the results. These instructions may be sent while the temperature value of the CPD 26-1-1 is in a preferred temperature range. This may be done a number of times over a number of days or weeks to determine an average baseline downstream throughput value 60.

Similarly, the controller device 12 may send the CPD 26-1-1 an instruction to determine a round trip latency (RTL) value 62 that quantifies a DOCSIS round trip latency IPv4 or IPv6 metric. The controller device 12 may send instructions to the CPD 26-1-1 periodically requesting memory utilization values and CPU utilization values to determine a memory utilization value 64 and a CPU utilization value 66.

In some embodiments, rather than being requested by the controller device 12, the telemetry agent 34-1-1 may periodically provide such information to the controller device 12, and the controller device 12 generates the DS throughput value 60, RTL value 62, memory utilization value 64, and CPU utilization value 66 based on the periodic information received from the telemetry agent 34-1-1. In other embodiments, the CPD default profiles 38 may include initial baseline values for these operational metrics based on analysis of historical baseline values for the particular type of CPD 26, and the controller device 12 may tailor the baseline values for the CPD 26-1-1 over time based on the actual operational values received from the CPD 26-1-1.

The telemetry agent 34-1-1 intermittently, periodically, or upon the occurrence of certain events, determines certain operational values associated with the CPD 26-1-1 and sends the operational values to the controller device 12. As an example, the telemetry agent 34-1-1 may access the sensor 36-1-1 to obtain a temperature value that quantifies a temperature of the CPD 26-1-1, such as the temperature of a component of the CPD 26-1-1, the temperature of the interior volume of the CPD 26-1-1, or any other suitable temperature that may be valuable in determining if the CPD 26-1-1 is operating in an undesirable temperature range. In some embodiments, the telemetry agent 34-1-1 may access the sensor 36-1-1 a number of times over a predetermined period of time, such as 30 seconds, and generate an average temperature value. The telemetry agent 34-1-1 may also gather any other telemetry data, as discussed above, and send the telemetry data with a unique identifier of the CPD 26-1-1 to the controller device 12.

The controller device 12 receives the telemetry data from the CPD 26-1-1, and, based on the unique identifier of the CPD 26-1-1, accesses the CPD profile 52-1-1 that corresponds to the CPD 26-1-1. The controller device 12 accesses the preferred temperature range value 54 and compares the received temperature value to the preferred temperature range value 54 to determine whether the received temperature value is outside of the preferred temperature range. If not, the controller device 12 may continue to execute other tasks. If the received temperature value is outside of the preferred temperature range, the controller device 12 may send an instruction to the CPD 26-1-1 to transition from a current energy consumption operating mode to a reduced energy consumption operating mode. The CPD 26-1-1 receives the instruction and transitions to a reduced energy consumption operating mode. The telemetry agent 34-1-1 may continue to periodically determine a temperature value for the CPD 26-1-1 and determine other telemetry information and send such information to the controller device 12. If the temperature value returns to the preferred temperature range, the controller device 12 may then instruct the CPD 26-1-1 to return to a default energy consumption operating mode.

Figure 2:
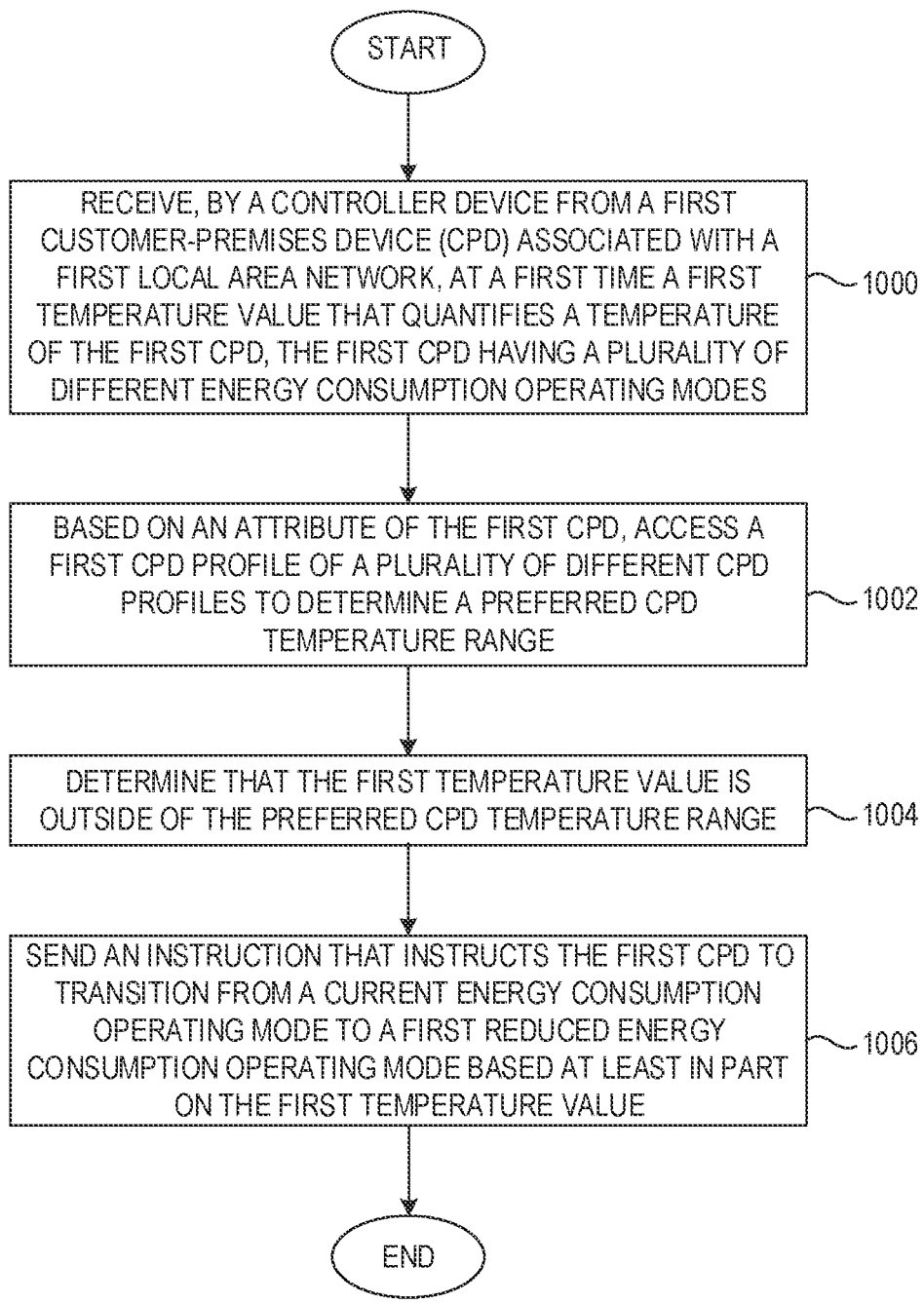
FIG. 2 is a flowchart of a method for centralized profile-based operational monitoring and control of remote computing devices according to one embodiment.

FIG. 2 is a flowchart of a method for centralized profile-based operational monitoring and control of remote computing devices according to one embodiment. FIG. 2 will be discussed in conjunction with FIG. 1. The controller device 12 receives, from the CPD 26-1-1 associated with the local area network 28, at a first time a first temperature value that quantifies a temperature of the CPD 26-1-1, the CPD 26-1-1 having the plurality of different energy consumption operating modes (FIG. 2, block 1000). The controller device 12, based on an attribute of the CPD 26-1-1, such as the unique identifier of the CPD 26-1-1, accesses the CPD profile 52-1-1 of the plurality of different CPD profiles 52 to determine a preferred CPD temperature range (FIG. 2, block 1002). The controller device 12 determines that the temperature value is outside of the preferred CPD temperature range (FIG. 2, block 1004). The controller device 12 sends an instruction that instructs the CPD 26-1-1 to transition from a current energy consumption operating mode to a first reduced energy consumption operating mode based at least in part on the first temperature value (FIG. 2, block 1006).

Figure 3:
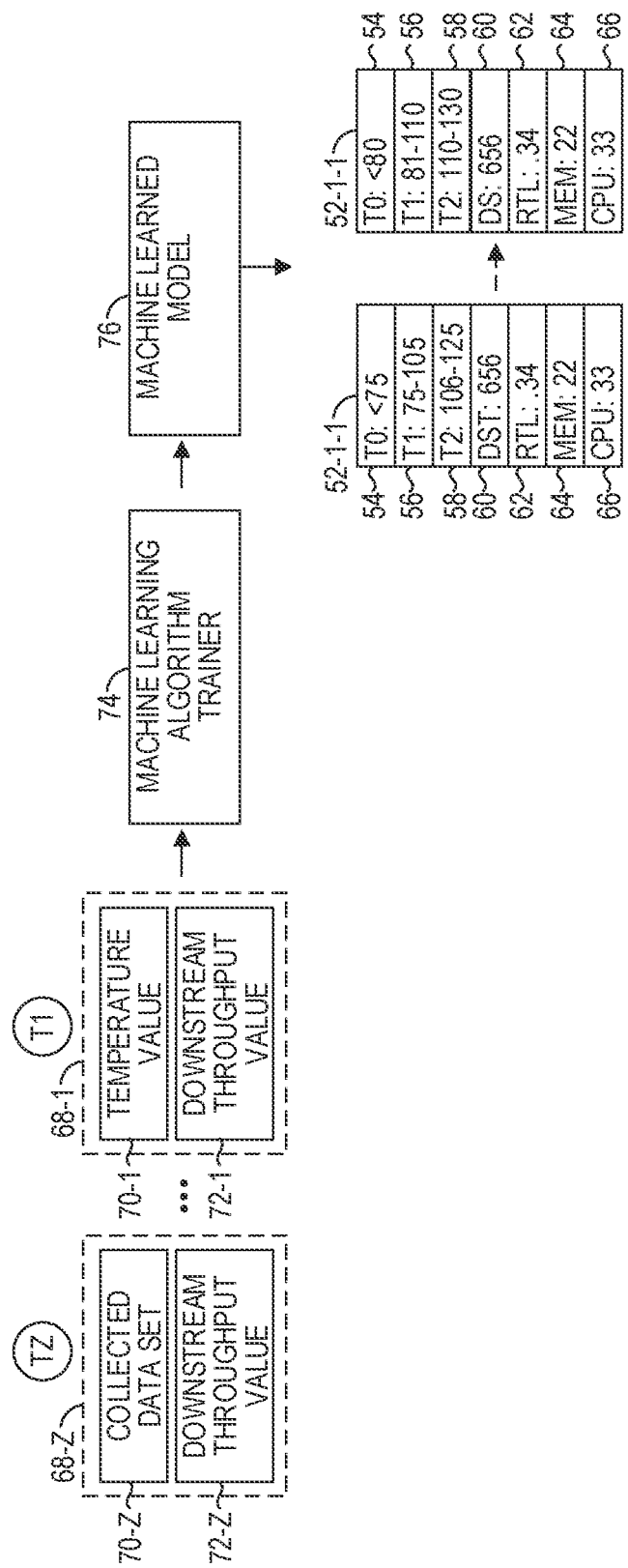
FIG. 3 is a block diagram of a training process for a machine-learned model for optimizing the operational values contained in a customer-premises device (CPD) profile according to one embodiment.

FIG. 3 is a block diagram of a training process for a machine-learned model for optimizing the operational values contained in a CPD profile 52 according to one embodiment. In this embodiment, the controller device 12 receives, at each of a plurality of times T1-TZ, corresponding telemetry data 68-1-68-Z (generally, telemetry data 68) that includes a temperature value of the CPD 26-1-1 and at least one other operational value that quantifies an additional operational metric of the CPD 26-1-1 at the corresponding time T1-TZ. The additional operational metric may comprise any suitable operational metric the performance of which may degrade in response to rising temperatures of the CPD 26-1-1. By way of non-limiting examples, the additional operational metric may comprise one or more of a downstream throughput measured at the CPD 26-1-1, an upstream throughput measured at the CPD 26-1-1, and/or a round-trip latency measured at the CPD 26-1-1. The plurality of times T1-TZ may comprise any number of samples, such as 100, 1000, or any other suitable sample size over any desired period of time. The controller device 12 stores the telemetry data 68.

In this example the additional operational metric comprises a downstream throughput measured at the CPD 26-1-1. Each telemetry data 68-1-68-Z includes a corresponding temperature value 70-1-70-Z and downstream throughput value 72-1-72-Z. The controller device 12, or another component, such as a machine learning algorithm trainer 74, subsequently accesses the telemetry data 68-1-68-Z and trains a machine-learned model 76 using the temperature values 70-1-70-Z and downstream throughput values 72-1-72-Z.

A component, such as the controller device 12, or another component, queries the machine-learned model 76 to determine the temperature ranges of the CPD 26-1-1 where the operational metric, in this example, the downstream throughput, did not suffer a reduction in performance beyond some predetermined initial performance threshold. This temperature range may then be determined to be a new default preferred CPD temperature range for the CPD 26-1-1 that is based on operational metrics received from the CPD 26-1-1 over time. The component may also determine non-preferred temperature ranges wherein there was a corresponding reduction in downstream throughput within predetermined corresponding threshold reductions to determine new non-preferred temperature ranges.

The component utilizes this information to store a new default preferred temperature range 54 and new non-preferred temperature ranges 56 and 58 in the CPD profile 52-1-1 in lieu of the default preferred temperature range 40 and non-preferred temperature ranges 42 and 44. In this example, the new machine-learned model 76 indicates that the CPD 26-1-1 can operate at a slightly higher temperature, 80 degrees, without suffering a reduction in downstream throughput, as opposed to the 75 degree value contained in the CPD default profile 38-2-1.

Figure 4:
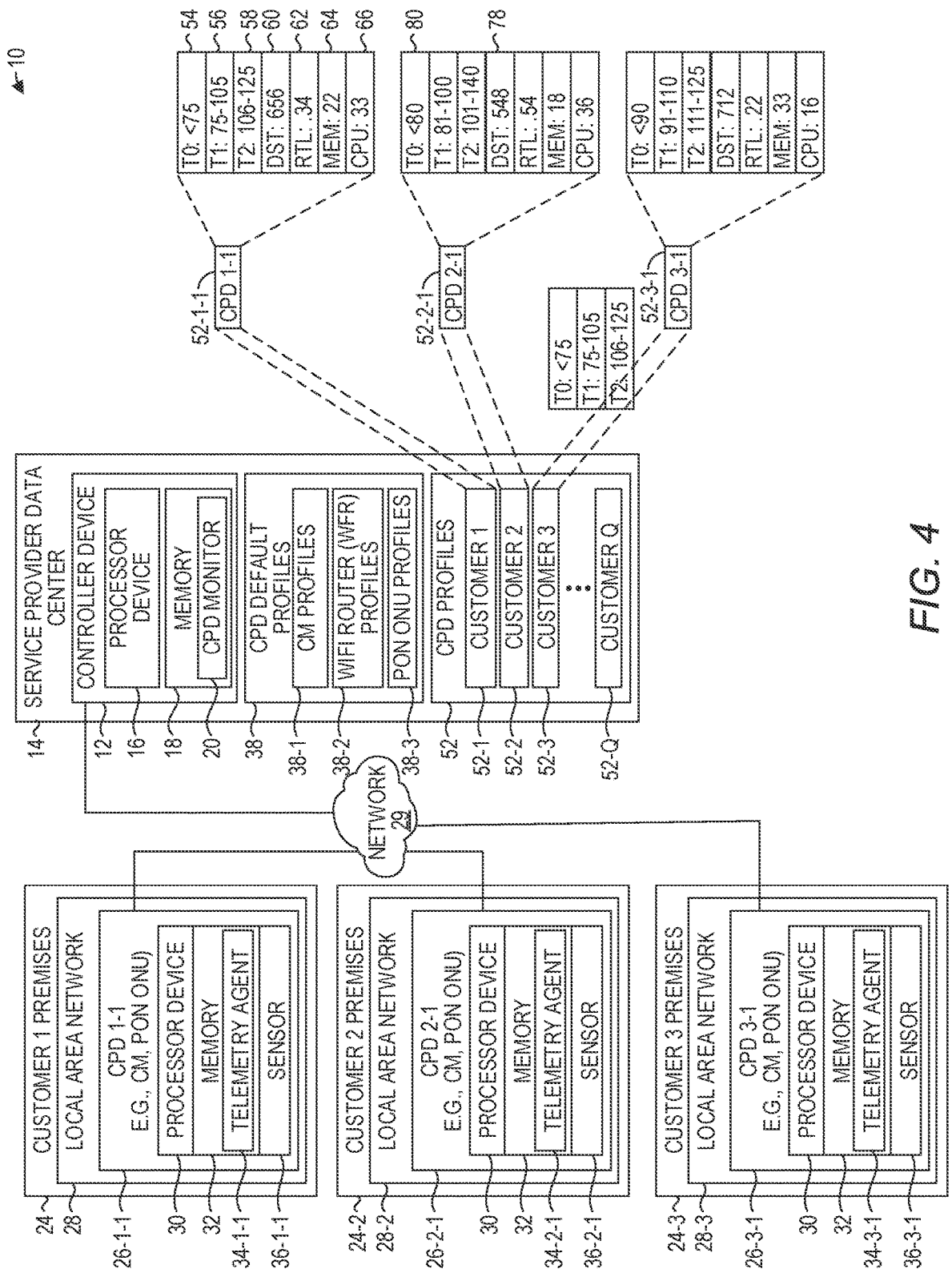
FIG. 4 is a block diagram of the environment illustrated in FIG. 1 illustrating a controller device substantially concurrently interacting with a plurality of different CPDs associated with a plurality of different local area networks located in a plurality of different customer premises, according to one embodiment.

FIG. 4 is a block diagram of the environment 10 illustrating the controller device 12 substantially concurrently interacting with a plurality of different CPDs 26-1-1, 26-2-1, and 26-3-1 associated with a plurality of different local area networks 28, 28-2, 28-3 located in a plurality of different customer premises 24, 24-2, 24-3. The CPDs 26-2-1 and 26-3-1 include processors 30, memory 32, and telemetry agents 34-2-1 and 34-3-1, respectively, which operate substantially similarly to the telemetry agent 34-1-1 as described above. The CPDs 26-2-1 and 26-3-1 also include sensors 36-2-1 and 36-3-1, respectively, which are configured to measure temperatures of the CPDs 26-2-1 and 26-3-1, in a manner similar to the sensor 36-1-1 described above.

Figure 5A:
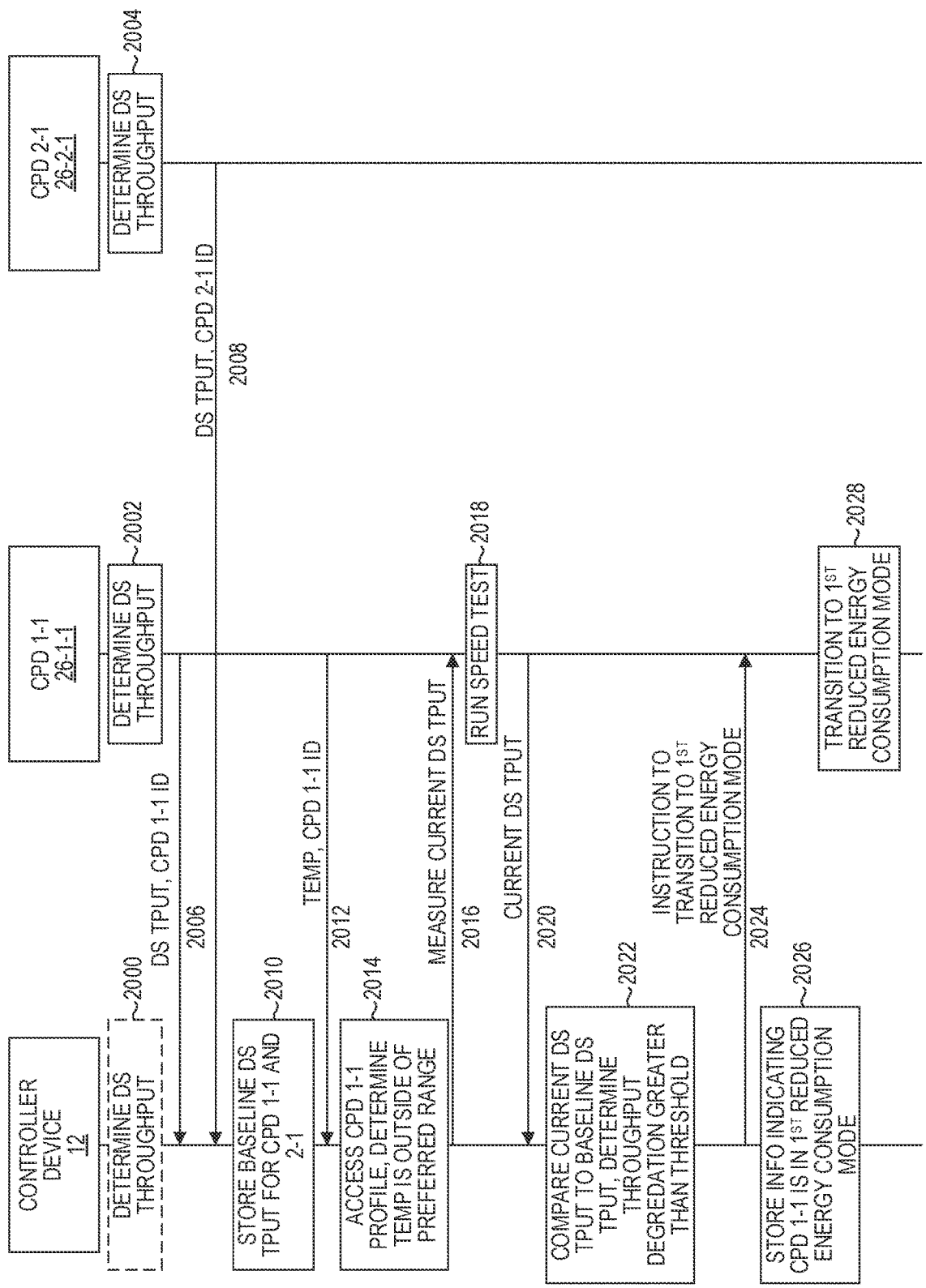
FIGS. 5A and 5B illustrate a sequence diagram the depicts interactions between the controller device and two of the CPDs illustrated in FIG. 4, according to one embodiment.
Figure 5B:
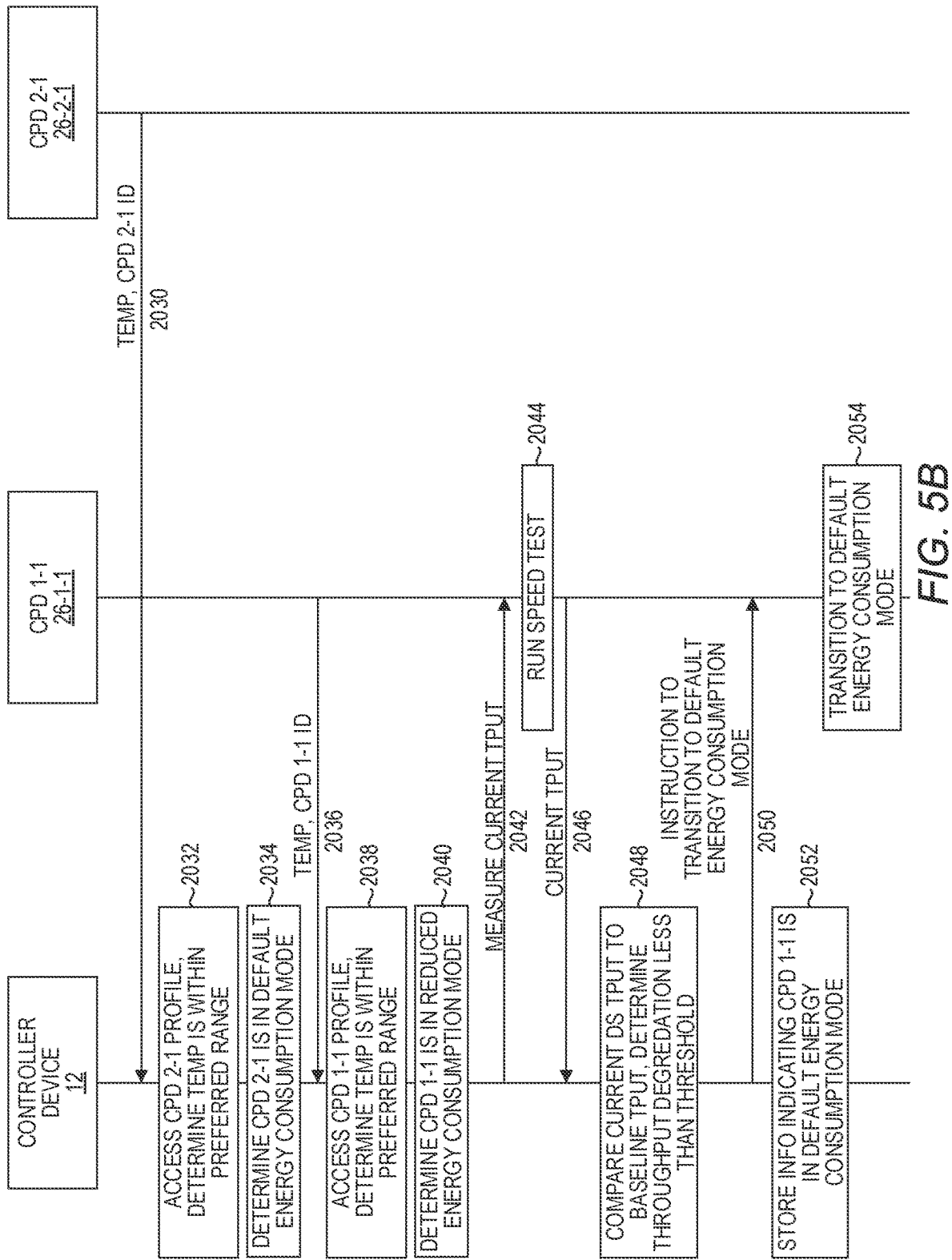

The controller device 12 uses a plurality of CPD profiles 52-1, 52-2, and 52-3 to provide centralized profile-based operational monitoring and control of the CPDs 26-1-1, 26-2-1 and 26-3-1. FIGS. 5A and 5B illustrate a sequence diagram that depicts example interactions between the controller device 12 and the CPDs 26-1-1 and 26-2-1 according to one embodiment. FIGS. 5A and 5B will be discussed in conjunction with FIG. 4. Over a period of time, the controller device 12 obtains or determines a baseline DS throughput value for each of the CPDs 26-1-1 and 26-2-1. The controller device 12 may determine the baseline DS throughput values based on averaging DS throughput values provided by the CPDs 26-1-1 and 26-2-1 while operating within the preferred temperature range (step 2000). In other embodiments, the CPDs 26-1-1 and 26-2-1 may determine the baseline DS throughput values and provide the baseline DS throughput values to the controller device 12 (steps 2002-2008). The controller device 12 stores the DS throughput value 60 for the CPD 26-1-1 and a DS throughput value 78 for the CPD 26-2-1 (step 2010).

The CPD 26-1-1 sends a temperature value that quantifies a temperature of the CPD 26-1-1, such as a current temperature or an average temperature, to the controller device 12 (step 2012). The controller device 12 access the CPD profile 52-1-1 and determines that the temperature is outside of the preferred temperature range 54 (step 2014). The controller device 12 sends an instruction to the CPD 26-1-1 to measure an operational metric of the CPD 26-1-1, in this example, a downstream throughput of the CPD 26-1-1 (step 2016). The CPD 26-1-1 initiates a speed test with an Internet server that offers a speed test service (step 2018). In some implementations, the speed test may be provided via a service provider that manages the CPD 26-1-1. In some implementations, the speed test may be an IPerf speed test available at iperf.fr.

The CPD 26-1-1 sends a DS throughput value that quantifies the downstream throughput based on the speed test (step 2020). The controller device 12 accesses the baseline DS throughput value 60 identified in the CPD profile 52-1-1 and determines that the current downstream throughput of the CPD 26-1-1 is outside of a preferred operational metric range. For example, the controller device 12 may determine whether the current downstream throughput is reduced with respect to the baseline DS throughput value 60 by an amount greater than a predetermined threshold (step 2022).

Based on both the temperature value being outside the preferred temperature range 54 and the current downstream throughput being reduced greater than the predetermined threshold, the controller device 12 sends an instruction to the CPD 26-1-1 to transition to a first reduced energy consumption operating mode (step 2024). The instruction may include a timeframe for staying in the first reduced energy consumption operating mode. The controller device 12 may store information that indicates that the CPD 26-1-1 is now in a reduced energy consumption operating mode (step 2026). The CPD 26-1-1 transitions to a first reduced energy consumption operating mode (step 2028).

Referring now to FIG. 5B, the CPD 26-2-1 sends the controller device 12 a temperature value and an identifier of the CPD 26-2-1 (step 2030). The controller device 12 accesses the CPD profile 52-2-1 and determines that the temperature is within a preferred temperature range 80 (step 2032). The controller device 12 accesses information that identifies the current energy consumption operating mode of the CPD 26-2-1 and determines that the CPD 26-2-1 is in the default energy consumption operating mode (step 2034). Because the temperature is within the preferred temperature range 80 the controller device 12 does not send an instruction to the CPD 26-2-1.

The CPD 26-1-1 sends the controller device 12 a temperature value and an identifier of the CPD 26-1-1 (step 2036). The controller device 12 accesses the CPD profile 52-1-1 and determines that the temperature is within the preferred temperature range 54 (step 2038). The controller device 12 accesses information that indicates that the CPD 26-1-1 is in a reduced energy consumption operating mode (step 2040). The controller device 12 sends an instruction to the CPD 26-1-1 to measure the downstream throughput of the CPD 26-1-1 (step 2042). The CPD 26-1-1 initiates a speed test with an Internet server that offers a speed test service (step 2044). The CPD 26-1-1 sends a DS throughput value that quantifies the downstream throughput based on the speed test (step 2046). The controller device 12 accesses the baseline DS throughput value 60 identified in the CPD profile 52-1-1 and determines that the current downstream throughput of the CPD 26-1-1 is within a preferred operational metric range (step 2048). Based on both the temperature value being within the preferred temperature range 54 and the current downstream throughput being within the preferred operational metric range, the controller device 12 sends an instruction to the CPD 26-1-1 to transition to the default energy consumption operating mode (step 2050). The controller device 12 may store information that indicates that the CPD 26-1-1 is now in the default energy consumption operating mode (step 2052). The CPD 26-1-1 transitions to the default energy consumption operating mode (step 2054).

While for purposes of illustration and clarity, only example interactions between the controller device 12 and the CPDs 26-1-1 and 26-2-1 have been illustrated; however it is noted that in practice similar interactions occur between the controller device 12 and the CPD 26-3-1, and between the controller device 12 and potentially hundreds or thousands of other CPDs 26, each of which may be associated with a different local area network and located in a different customer premises.

Figure 6A:
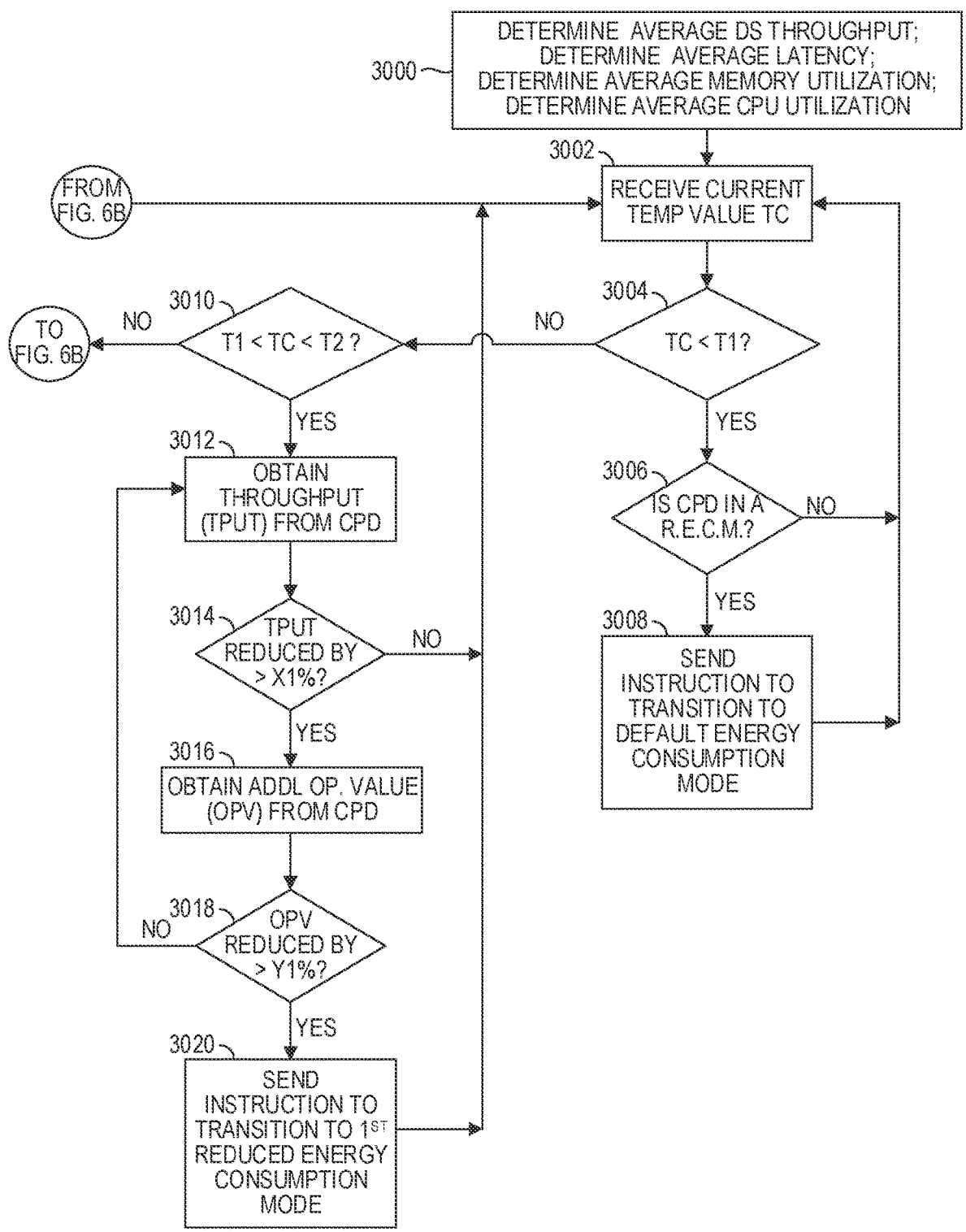
FIGS. 6A and 6B are a flowchart of a method for practicing centralized profile-based operational monitoring and control of remote computing devices according to another embodiment.
Figure 6B:
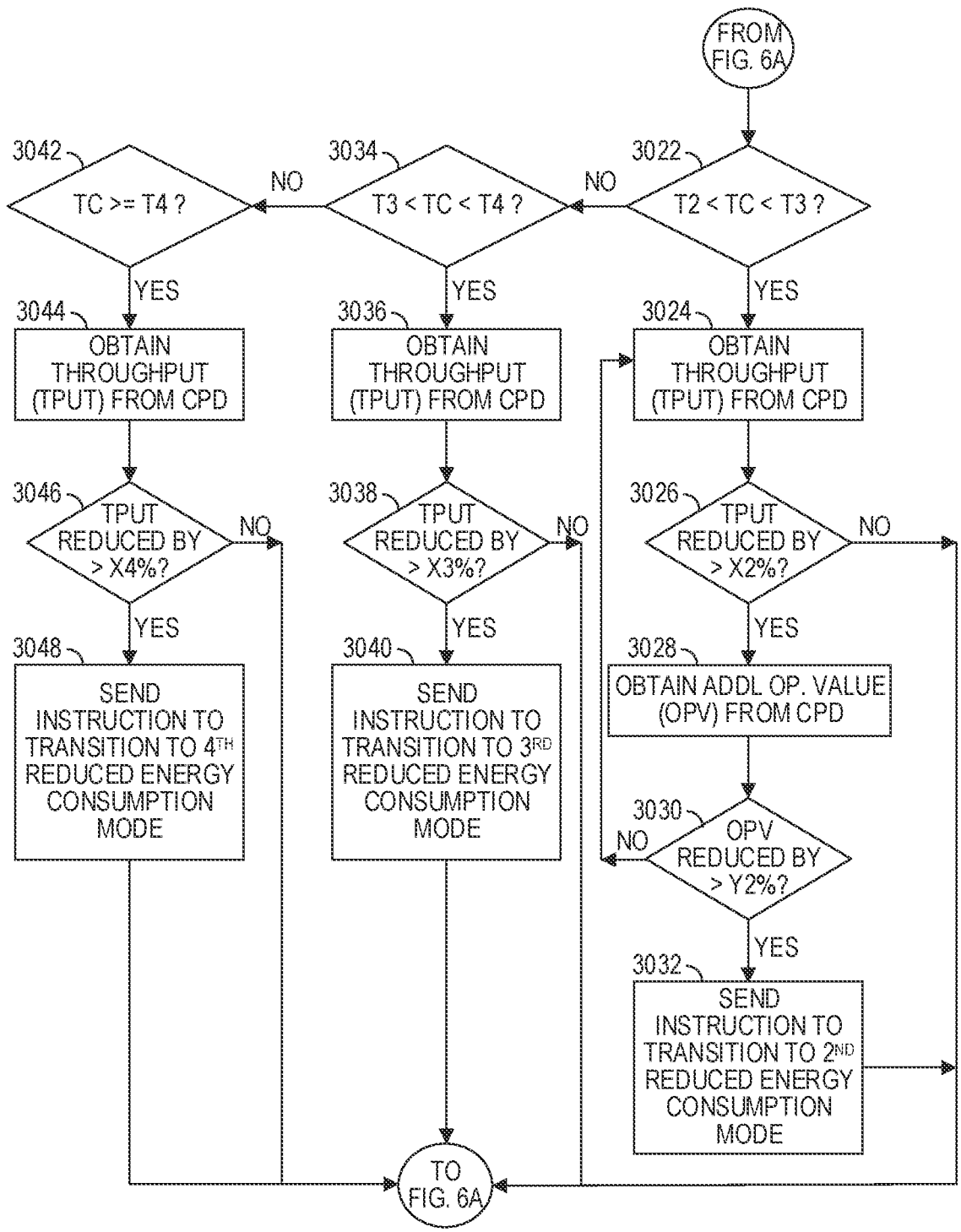

FIGS. 6A and 6B are a flowchart of a method for practicing centralized profile-based operational monitoring and control of remote computing devices according to another embodiment. In this embodiment, the controller device 12 utilizes the metrics illustrated in Table 1 to make various decisions, as will be discussed in greater detail below. It will be appreciated that the thresholds and conditions in Table 1 are merely examples, and any suitable thresholds and/or conditions may be used. Some or all of these metrics may be stored in the CPD profile 52-1-1. Alternatively, in some embodiments, the metrics T1-T4 may be stored in the CPD profile 52-1-1, and the remainder of the metrics may apply systemwide to all CPDs 26.

TABLE 1

T1 = First temperature threshold (25° C.)
T2 = Second temperature threshold (85° C.)
T3 = Third temperature threshold (105° C.)
T4 = Fourth temperature threshold (125° C.)
X1 = First DS TCP throughput reduction threshold (20% relative to baseline DS throughput)
X2 = Second DS TCP throughput reduction threshold (40% relative to baseline DS throughput)
X3 = Third DS TCP throughput reduction threshold (70% relative to baseline DS throughput)
X4 = Fourth DS TCP throughput reduction threshold (90% relative to baseline DS throughput)
Y1a = DOCSIS IP4/IPv6 round-trip latency threshold (20% increase relative to baseline RTL)
Y1b = Average available free system memory (>75%) (The amount of available free memory is reduced at higher temperatures, while the CPU utilization is increased)
Y1c = Average system CPU utilization (>75%)
Y2a = DOCSIS IP4/IPv6 round-trip latency threshold (40% increase relative to baseline RTL)

TABLE 1-continued

Y2b = Average available free system memory (>50% to <75%)
Y2c = Average system CPU utilization (>85%)

FIGS. 6A and 6B will discussed with reference to FIG. 1 and the CPD 26-1-1. Referring first to FIG. 6A, the controller device 12 determines the baseline DS throughput value 60 and the RTL value 62 that quantifies a DOCSIS round trip latency IPv4 or IPv6 metric in the manner discussed above, and stores such information in the CPD profile 52-1-1 (block 3000). The controller device 12 receives a current temperature value (TC) from the CPD device 26-1-1 (step 3002). The controller device 12 compares the current temperature value TC to the temperature threshold T1 to determine whether the current temperature value TC is less than the temperature threshold T1 (step 3004). If the current temperature value TC is less than the temperature threshold T1, then the current temperature value TC is in the CPD preferred temperature range 54 and the controller device 12 accesses information to determine whether the CPD 26-1-1 is currently in a reduced energy consumption operating mode (step 3006). If so, the controller device 12 sends an instruction to the CPD 26-1-1 to return to the default energy consumption operating mode (block 3008). Processing then returns to step 3002 to await a next temperature value from the CPD 26-1-1.

If at step 3004 the current temperature value TC is greater than the temperature threshold T1, the controller device 12 determines whether the current temperature value TC is between the temperature thresholds T1 and T2 (step 3010). If so, the controller device 12 sends an instruction to the CPD 26-1-1 to perform a speed test to quantify the DS throughput, and provide the DS throughput value TPUT to the controller device 12 (step 3012). After receiving the DS throughput value TPUT from the CPD 26-1-1, the controller device 12 determines whether the DS throughput value TPUT is greater than an X1 reduction (20%) relative to the baseline DS throughput value 60 (step 3014). If not, processing returns to step 3002 to await a next temperature value from the CPD 26-1-1. If so, then the controller device 12 sends an instruction to the CPD 26-1-1 to measure additional operational metrics and to provide the results to the controller device 12 (step 3016). Such additional operational metrics may comprise, for example, a DOCSIS round trip latency IPv4 or IPv6 metric, an average system free memory utilization metric, and an average CPU utilization metric, by way of non-limiting example. The controller device 12 then determines whether the values provided by the CPD 26-1-1 exceed the thresholds Y1a, Y1b, and Y1c, respectively (step 3018). If so, then the controller device 12 sends an instruction to the CPD 26-1-1 to transition to a first reduced energy consumption operating mode (block 3020), and processing returns to step 3002 to await a next temperature value from the CPD 26-1-1. The instruction may include a timeframe for staying in the first reduced energy consumption operating mode. In this example, the first reduced energy consumption operating mode may comprise a DOCSIS Light Sleep mode wherein the CPD 26-1-1 repeatedly sleeps for a predetermined period of time, such as 200 ms, and wakes up, in an effort to reduce energy consumption and thereby reduce temperatures.

If at step 3018 the controller device 12 determines that the values provided by the CPD 26-1-1 do not exceed the thresholds Y1a, Y1b, and Y1c, processing may return to step 3012 where the controller device 12 sends an instruction to the CPD 26-1-1 to perform a speed test to quantify the DS throughput.

If at step 3010 the current temperature value TC is not between the temperature thresholds T1 and T2, the controller device 12 determines whether the current temperature value TC is between the temperature thresholds T2 and T3, as illustrated on FIG. 6B (step 3022). If so, the controller device 12 sends an instruction to the CPD 26-1-1 to perform a speed test to quantify the DS throughput, and provide the DS throughput value TPUT to the controller device 12 (step 3024). After receiving the DS throughput value TPUT from the CPD 26-1-1, the controller device 12 determines whether the DS throughput value TPUT is greater than an X2 reduction (40%) relative to the baseline DS throughput value 60 (step 3026). If not, processing returns to step 3002 to await a next temperature value from the CPD 26-1-1. If so, then the controller device 12 sends an instruction to the CPD 26-1-1 to measure additional operational metrics and to provide the results to the controller device 12 (step 3028). Such additional operational metrics may comprise, for example, a DOCSIS round trip latency IPv4 or IPv6 metric, an average system free memory utilization metric, and an average CPU utilization metric, by way of non-limiting example. The controller device 12 then determines whether the values provided by the CPD 26-1-1 exceed the thresholds Y2a, Y2b, and Y2c, respectively (step 3030). If so, then the controller device 12 sends an instruction to the CPD 26-1-1 to transition to a second reduced energy consumption operating mode (step 3032), and processing returns to step 3002 to await a next temperature value from the CPD 26-1-1. In this example, the second reduced energy consumption operating mode may comprise a DOCSIS idle mode where the CPD 26-1-1 does not transmit or receive for a period of time, in an effort to reduce energy consumption and thereby reduce temperatures, but may still be able to receive, for example, periodic control messages from a CMTS, and respond to the periodic control messages. The period of time may be specified in the instruction to transition to the second reduced energy consumption operating mode.

If at step 3030 the controller device 12 determines that the values provided by the CPD 26-1-1 do not exceed the thresholds Y2a, Y2b, and Y2c, processing may return to step 3024 where the controller device 12 sends an instruction to the CPD 26-1-1 to perform a speed test to quantify the DS throughput.

If at step 3022 the current temperature value TC is not between the temperature thresholds T2 and T3, the controller device 12 determines whether the current temperature value TC is between the temperature thresholds T3 and T4 (step 3034). If so, the controller device 12 sends an instruction to the CPD 26-1-1 to perform a speed test to quantify the DS throughput, and provide the DS throughput value TPUT to the controller device 12 (step 3036). After receiving the DS throughput value TPUT from the CPD 26-1-1, the controller device 12 determines whether the DS throughput value TPUT is greater than an X3 reduction (70%) relative to the baseline DS throughput value 60 (step 3038). If not, processing returns to step 3002 to await a next temperature value from the CPD 26-1-1. If so, then the controller device 12 sends an instruction to the CPD 26-1-1 to transition to a third reduced energy consumption operating mode (block 3040), and processing returns to step 3002 to await a next temperature value from the CPD 26-1-1. In this example, the third reduced energy consumption operating mode may comprise a voice-only mode where the CPD 26-1-1 no longer provides data services but continues to provide voice services.

If at step 3034 the current temperature value TC is not between the temperature thresholds T3 and T4, the controller device 12 determines whether the current temperature value TC is greater than the temperature threshold T4 (step 3042). If so, the controller device 12 sends an instruction to the CPD 26-1-1 to perform a speed test to quantify the DS throughput, and provide the DS throughput value TPUT to the controller device 12 (step 3044). After receiving the DS throughput value TPUT from the CPD 26-1-1, the controller device 12 determines whether the DS throughput value TPUT is greater than an X4 reduction (90%) relative to the baseline DS throughput value 60 (step 3046). If not, processing returns to step 3002 to await a next temperature value from the CPD 26-1-1. If so, then the controller device 12 sends an instruction to the CPD 26-1-1 to transition to a fourth reduced energy consumption operating mode (block 3048), and processing returns to step 3002 to await a next temperature value from the CPD 26-1-1. In this example, the fourth reduced energy consumption operating mode may comprise a shutdown mode wherein the CPD 26-1-1 shuts down for a period of time. In this situation, the service provider may notify the corresponding customer about the status of the CPD 26-1-1 and instruct the customer to subsequently turn on the CPD 26-1-1, and the controller device 12 can receive new temperature values and DS speed test throughputs to determine if CPD 26-1-1 can be returned to normal operation.

Figure 7:
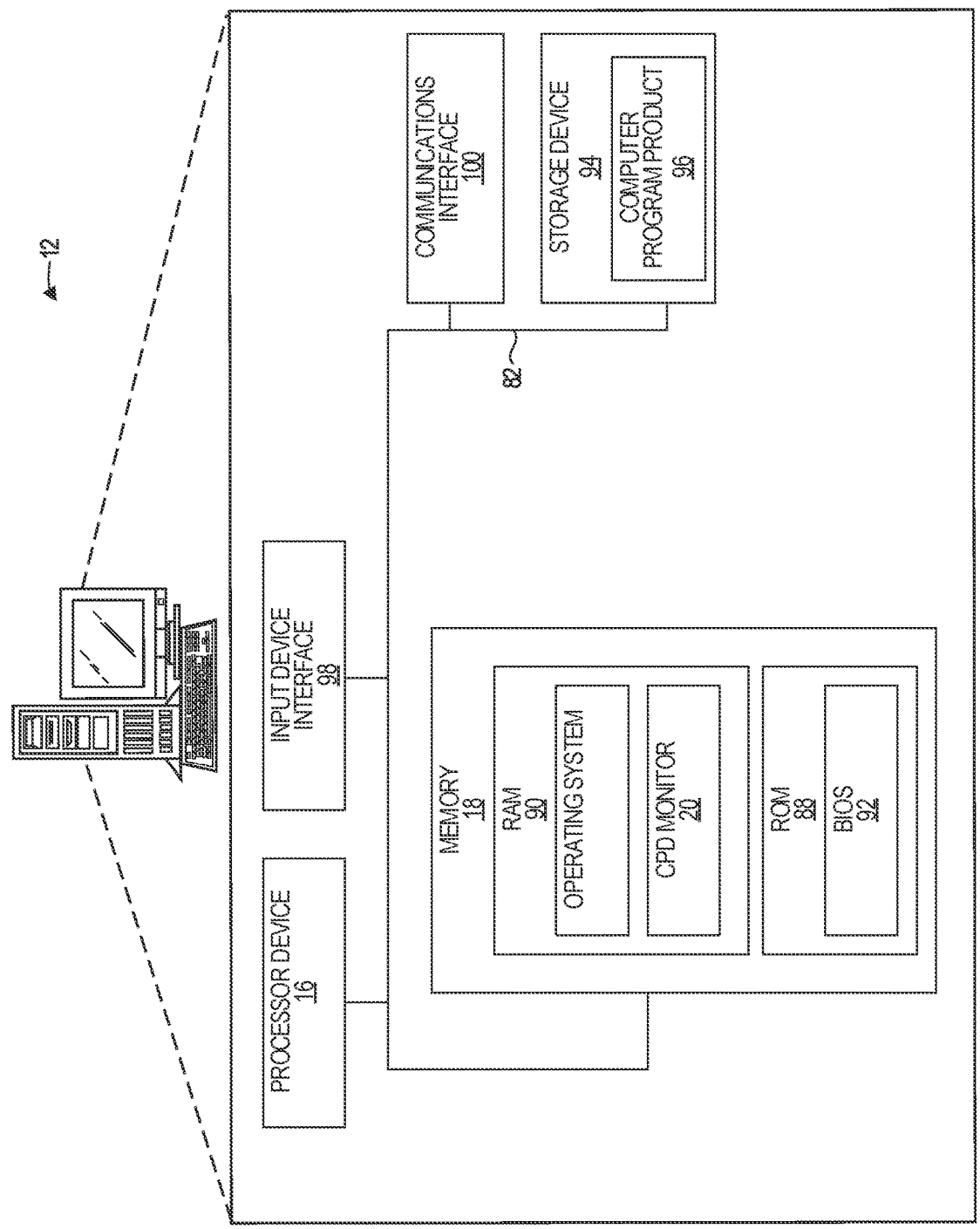
FIG. 7 is a block diagram of a controller device suitable for implementing embodiments disclosed herein.

FIG. 7 is a block diagram of the controller device 12 suitable for implementing examples according to one example. The controller device 12 may comprise any computing or electronic device capable of including firmware, hardware, and/or executing software instructions to implement the functionality described herein, such as a computer server, a desktop computing device, or the like. The controller device 12 includes the processor device 16, the system memory 18, and a system bus 82. The system bus 82 provides an interface for system components including, but not limited to, the system memory 18 and the processor device 16. The processor device 16 can be any commercially available or proprietary processor.

The system bus 82 may be any of several types of bus structures that may further interconnect to a memory bus (with or without a memory controller), a peripheral bus, and/or a local bus using any of a variety of commercially available bus architectures. The system memory 18 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the controller device 12. The volatile memory 90 may also include a high-speed RAM, such as static RAM, for caching data.

The controller device 12 may further include or be coupled to a non-transitory computer-readable storage medium such as a storage device 94, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 94 and other drives associated with computer-readable media and computer-usable media may provide non-volatile storage of data, data structures, computer-executable instructions, and the like. The storage device 94 may store, for example, the CPD default profiles 38 and CPD profiles 52. A number of modules can be stored in the storage device 94 and in the volatile memory 90, including an operating system and one or more program modules, such as the CPD monitor 20, which may implement the functionality described herein in whole or in part.

All or a portion of the examples may be implemented as a computer program product 96 stored on a transitory or non-transitory computer-usable or computer-readable storage medium, such as the storage device 94, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the CPD monitor 20 in the volatile memory 90, may serve as a controller, or control system, for the controller device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 16 through an input device interface 98 that is coupled to the system bus 82 but can be connected by other interfaces such as a parallel port, an Institute of Electrical and Electronic Engineers (IEEE) 1394 serial port, a Universal Serial Bus (USB) port, an IR interface, and the like. The controller device 12 may also include a communications interface 100 suitable for communicating with the CPD devices 26 as appropriate or desired.

Figure 8:
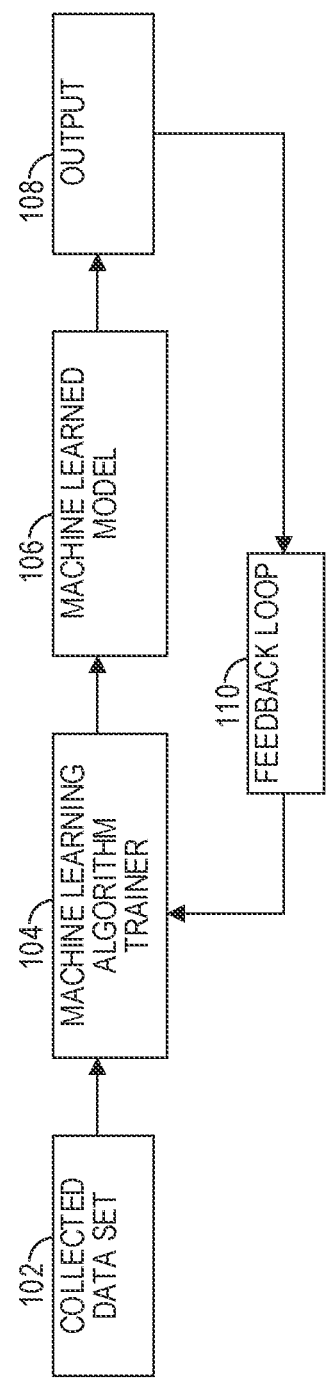
FIG. 8 is a block diagram of a training process for a machine-learned model for optimizing the operational values contained in a customer-premises device (CPD) profile according to one embodiment.

FIG. 8 is a block diagram of a training process for a machine-learned model for optimizing the operational values contained in a customer-premises device (CPD) profile according to another embodiment. Initially a default CPD profile 52 is defined, which may include a CPD normal operating range with initial threshold levels, CPD parameters that will be monitored, and reduced energy consumption operating modes with initial threshold levels.

A collected data set 102 that comprises on-going telemetry data is generated. A machine learning (ML) algorithm trainer 104 establishes initial threshold levels and parameter ranges for the normal operating mode and any reduced energy consumption operating modes. On-going telemetry collection occurs, involving continually monitoring the selected telemetry parameters and their frequency in order to assess the status of the field-deployed CPD 26.

Insight involves an analysis of the collected telemetry data via Complex Event Processing (CEP) or another method to identify meaningful patterns, correlations between parameters, trends, and relationships among multiple events to come-up with a CPD action plan. Actions or decisions include executing the action plan based on a CEP machine learned model 106. As more telemetry data is collected, the CPD action plan may be updated.

A goal of the ML algorithm trainer 104 is to train the machine learned model 106 to generate output 108 of updated metrics for a CPD 26 based on real-time telemetry data. This can be done using any suitable ML training platform, including, by way of non-limiting example, a Datarobot (datarobot.com) enterprise AI platform with automated decision intelligence. The selected ML training platform can be used to select a preferred training algorithm based on the collected CPD temperature values and downstream throughputs in order to establish the initial temperature range values and the downstream throughputs over a selected period of time. The initial temperature range for each of the reduced energy consumption modes can also be established. Other performance metrics values such as CPU utilization (%), relative amount of free memory (%), and the average IPv4/IPv6 round-trip DOCSIS latencies (between CMTS and the CPD) may also be collected.

The machine learned model 106 may be based on a Decision Tree algorithm, which includes a series of decisions and actions based on the on-going monitoring of the telemetry data received from the field-deployed CPD 26, or any other suitable algorithm.

Some of the machine learned model 106 decisions include:

Dynamically updating the initial temperature and downstream throughput threshold values for normal operation and for each of the reduced energy consumption operating modes. These may be derived, for example, from a database of collected historical temperature and downstream throughputs from other similar devices, and can be used on the machine learned model 106 to update the temperature and throughput ranges.

When the CPD 26 is instructed to transition to each of the reduced energy consumption modes, the machine learned model 106 decides how long the CPD 26 should stay in the reduced energy consumption mode. This can be accomplished, by way of non-limiting example, as follows:

A) use of trial-and-error based on the on-going collected CPD temperature readings, or B) obtaining an estimated value from other similar field-deployed CPDs 26 that were transitioned to each of the reduced energy consumption modes in the past, or C) a combination of both of these methods.

The machine learned model 106 monitors other telemetry data besides the temperature and downstream throughput values, including, by way of non-limiting example, round-trip (RT) DOCSIS latency, CPU utilization, free memory utilization, and the like. The ML algorithm trainer 104 can be further optimized by identifying patterns and strong correlations among the other collected metrics. If some of the other collected metrics such as CPU utilization are not meaningfully changed, these metrics may be removed or added from the ML algorithm trainer 104 via an automated feedback loop 110. This process may involve continuous refinement of the ML algorithm trainer 104 to minimize false positive events.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a controller device from a first customer-premises device (CPD) associated with a first local area network, at a first time a first temperature value that quantifies a temperature of the first CPD, the first CPD having a plurality of different energy consumption operating modes;
   based on an attribute of the first CPD identifying, from a plurality of CPD profiles, a first CPD profile that corresponds to the first CPD, at least some of the plurality of CPD profiles corresponding to different CPDs;
   accessing the first CPD profile to determine a preferred CPD temperature range for the first CPD;
   determining that the first temperature value is outside of the preferred CPD temperature range; and
   sending an instruction that instructs the first CPD to transition from a current energy consumption operating mode to a first reduced energy consumption operating mode based at least in part on the first temperature value.

2. The method of claim 1 wherein the first CPD comprises one of a cable modem, a wireless router, a wireless gateway, and a passive-optical network (PON) optical network unit (ONU).

3. The method of claim 1 wherein the attribute of the first CPD comprises a unique identifier, and wherein accessing the first CPD profile comprises accessing the first CPD profile based on the unique identifier.

4. The method of claim 1 further comprising:
   receiving a plurality of temperature values at a plurality of corresponding times, each temperature value quantifying a temperature of the first CPD at a corresponding time;
   receiving a plurality of operational values that quantify an operational metric of the first CPD, each operational value corresponding to one of the corresponding times;
   training a machine-learned model with at least the plurality of temperature values and the plurality of operational values;
   determining, from the machine-learned model, that the first CPD operates at a temperature outside of the preferred CPD temperature range without a reduction in the operational metric;
   generating a new preferred CPD temperature range; and
   storing the new preferred CPD temperature range in lieu of the preferred CPD temperature range in the first CPD profile.

5. The method of claim 4 wherein the new preferred CPD temperature range is a higher temperature range than the preferred CPD temperature range.

6. The method of claim 4 wherein the operational metric comprises at least one of a downstream throughput measured at the first CPD, an upstream throughput measured at the first CPD, and a round-trip latency measured at the first CPD.

7. The method of claim 1 further comprising:
   in response to determining that the first temperature value is outside of the preferred CPD temperature range, sending to the first CPD an instruction to measure a first operational metric of the first CPD;
   receiving, from the first CPD, a first operational value that quantifies the first operational metric;
   determining that the first operational value is outside a preferred first operational metric value range; and
   wherein sending the instruction that instructs the first CPD to transition from the current energy consumption operating mode to the first reduced energy consumption operating mode is based at least in part on the first temperature value and the first operational value.

8. The method of claim 7 wherein the first operational metric comprises at least one of a downstream throughput measured at the first CPD, an upstream throughput measured at the first CPD, and a round-trip latency measured at the first CPD.

9. The method of claim 7 further comprising:
in response to determining that the first operational value is outside the preferred first operational metric value range, sending to the first CPD an instruction to measure a second operational metric of the first CPD, the second operational metric being different from the first operational metric;
receiving, from the first CPD, a second operational value that quantifies the second operational metric;
determining that the second operational value is outside a preferred second operational metric value range; and
wherein sending the instruction that instructs the first CPD to transition from the current energy consumption operating mode to the first reduced energy consumption operating mode is based at least in part on the first temperature value, the first operational value and the second operational value.

10. The method of claim 1 further comprising:
receiving, by the controller device from the first CPD, at a second time that is subsequent to the first time, a second temperature value that quantifies a second temperature of the first CPD;
determining that the second temperature value is in the preferred CPD temperature range; and
sending an instruction that instructs the first CPD to transition from the first reduced energy consumption operating mode to a default energy consumption operating mode.

11. The method of claim 1 further comprising:
wherein determining that the first temperature value is outside of the preferred CPD temperature range comprises determining that the first temperature value is in a first non-preferred temperature range of a plurality of temperature ranges identified in the first CPD profile;
receiving, by the controller device from the first CPD, at a second time that is subsequent to the first time, a second temperature value that quantifies a temperature of the first CPD;
determining that the second temperature value is in a second non-preferred CPD temperature range that is a higher temperature range than the first non-preferred CPD temperature range; and
sending an instruction that instructs the first CPD to transition to a second reduced energy consumption operating mode that utilizes less energy than the first reduced energy consumption operating mode.

12. The method of claim 1 wherein the first CPD comprises a computing device that interfaces with a remote network to facilitate a receipt of data from the remote network that is destined for one or more other computing devices communicatively coupled to the first CPD via the first local area network, and wherein the first reduced energy consumption operating mode comprises a mode wherein the first CPD allows communications between the one or more other computing devices and the remote network at a reduced throughput relative to a throughput of the first CPD when in a default energy consumption operating mode.

13. The method of claim 1 wherein the first reduced energy consumption operating mode comprises a mode wherein the first CPD reduces a downstream throughput relative to a downstream throughput of a default energy consumption operating mode.

14. The method of claim 1 wherein the first CPD comprises a cable modem, and the first reduced energy consumption operating mode comprises a DOCSIS Light Sleep (DLS) mode.

15. The method of claim 14 wherein a second reduced energy consumption operating mode comprises an idle mode.

16. The method of claim 15 wherein the first CPD comprises a cable modem that provides both data services and voice services, and wherein a third reduced energy consumption operating mode comprises an energy consumption operating mode wherein data services are unavailable and voice services are available.

17. The method of claim 1 further comprising:
receiving, by the controller device in the remote network from a second CPD associated with a second local area network, at a second time a second temperature value that quantifies a temperature of the second CPD, the second CPD having the plurality of different energy consumption operating modes;
based on an attribute of the second CPD, accessing a second CPD profile of the plurality of CPD profiles to determine a preferred second CPD temperature range, the preferred second CPD temperature range being a different temperature range than the preferred CPD temperature range;
determining that the second temperature value is outside of the preferred second CPD temperature range; and
sending an instruction that instructs the second CPD to transition from the current energy consumption operating mode to the first reduced energy consumption operating mode based at least in part on the second temperature value.

18. A computing device, comprising:
a memory; and
a processor device coupled to the memory and configured to:
receive, from a first customer-premises device (CPD) associated with a first local area network, at a first time a first temperature value that quantifies a temperature of the first CPD, the first CPD having a plurality of different energy consumption operating modes;
based on an attribute of the first CPD identify, from a plurality of CPD profiles, a first CPD profile that corresponds to the first CPD, at least some of the plurality of CPD profiles corresponding to different CPDs;
access the first CPD profile to determine a preferred CPD temperature range for the first CPD;
determine that the first temperature value is outside of the preferred CPD temperature range; and
send an instruction that instructs the first CPD to transition from a current energy consumption operating mode to a first reduced energy consumption operating mode based at least in part on the first temperature value.

19. The computing device of claim 18 wherein the processor device is further configured to:
in response to determining that the first temperature value is outside of the preferred CPD temperature range, send to the first CPD an instruction to measure a first operational metric of the first CPD;
receive, from the first CPD, a first operational value that quantifies the first operational metric;
determine that the first operational value is outside a preferred first operational metric value range; and
wherein sending the instruction that instructs the first CPD to transition from the current energy consumption operating mode to the first reduced energy consumption operating mode is based at least in part on the first temperature value and the first operational value.

20. A non-transitory computer-readable storage medium that includes executable instructions configured to cause a processor device to:
- receive, from a first customer-premises device (CPD) associated with a first local area network, at a first time a first temperature value that quantifies a temperature of the first CPD, the first CPD having a plurality of different energy consumption operating modes;
- based on an attribute of the first CPD identify, from a plurality of CPD profiles, a first CPD profile that corresponds to the first CPD, at least some of the plurality of CPD profiles corresponding to different CPDs;
- access the first CPD profile to determine a preferred CPD temperature range for the first CPD;
- determine that the first temperature value is outside of the preferred CPD temperature range; and
- send an instruction that instructs the first CPD to transition from a current energy consumption operating mode to a first reduced energy consumption operating mode based at least in part on the first temperature value.

21. The non-transitory computer-readable storage medium of claim 20 wherein the executable instructions are further configured to cause the processor device to:
- receive, from the first CPD, at a second time that is subsequent to the first time, a second temperature value that quantifies a second temperature of the first CPD;
- determine that the second temperature value is in the preferred CPD temperature range; and
- send an instruction that instructs the first CPD to transition from the first reduced energy consumption operating mode to a default energy consumption operating mode.

* * * * *